United States Patent
Moshavi et al.

(10) Patent No.: US 6,996,159 B2
(45) Date of Patent: Feb. 7, 2006

(54) REDUCING SPREAD SPECTRUM NOISE

(75) Inventors: Shimon Moshavi, Bet Shemesh (IL); Daniel Yellin, Raanana (IL)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 09/860,032

(22) Filed: May 17, 2001

(65) Prior Publication Data

US 2003/0021337 A1 Jan. 30, 2003

(51) Int. Cl.
*H04K 1/00* (2006.01)

(52) U.S. Cl. .................................................... 375/148

(58) Field of Classification Search ............... 375/144, 375/148, 285, 346, 348, 349; 455/501, 63, 455/67.3

See application file for complete search history.

(56) References Cited

U.S. PATENT DOCUMENTS

| 6,009,089 A | 12/1999 | Huang et al. ............... 370/342 |
| 6,034,986 A | 3/2000 | Yellin ......................... 375/200 |
| 6,067,292 A | 5/2000 | Huang et al. ............... 370/342 |
| 6,175,587 B1 * | 1/2001 | Madhow et al. ............ 375/148 |
| 6,570,909 B1 * | 5/2003 | Kansakoski et al. ........ 375/148 |

FOREIGN PATENT DOCUMENTS

| EP | 1 022 862 A2 | 7/2000 |
| WO | WO 98/43362 | 10/1998 |
| WO | WO 00/24135 | 4/2000 |

* cited by examiner

*Primary Examiner*—Young T. Tse
(74) *Attorney, Agent, or Firm*—Trop, Pruner & Hu, P.C.

(57) ABSTRACT

Estimates of interference from co-channel pilot signals from one or more base stations may be formed at a receiver and subtracted out from the received signal to improve the detection of a desired signal. The complexity of pilot interference cancellation may be reduced by selecting only particular crosscorrelation terms to be estimated and processed. The remaining terms or crosscorrelation values may be eliminated from the computation, reducing computational complexity. In addition, selection decisions may be stored to reduce the need to excessively reevaluate the selection decision.

26 Claims, 8 Drawing Sheets

REDUCING SPREAD SPECTRUM NOISE

BACKGROUND

The present invention relates to spread spectrum communication systems generally and to noise reducing units in mobile handsets of such communication systems in particular.

A conventional spread spectrum signal can be viewed as the result of mixing a narrowband information-bearing signal i[t] with an informationless wideband "spreading" signal p[t]. If $B_i$ and $B_p$ denote the bandwidths of i[t] and p[t], respectively, then the "processing gain" available to the receiver is $B_p/B_i$. The receiver synchronizes the incoming signal to a locally generated version $p_0[t]$ of p[t] and mixes the received signal with $p_0[t]$, thereby removing p[t] from the signal and "collapsing" the signal to the "information bandwidth" $B_i$.

The spreading signal p[t] is typically a coding sequence of some kind, such as a pseudo-random code. In many code division multiple access (CDMA) systems, the code is an M-sequence which has good "noise like" properties yet is very simple to construct.

For example, in the IS-95 standard for cellular communication, the forward channel (base to mobile units) employs, as a spreading code, the product of a 64 chip Walsh code (aimed at separating up to 64 different users per base) and a periodic pseudorandom noise (PN) sequence (aimed at separating the different bases). See TIA/EIA IS-95A "Mobile System-Base Station Compatibility Standard for Dual-Mode Wideband Spread Spectrum Cellular System" Telecommunication Industry Association. Thus, the spreading signal p[t] for each user is its Walsh code combined with the current 64 chips of the PN sequence of its base station.

In order to synchronize the local version $p_0[t]$ of the spreading signal with the original version p[t], the base station additionally transmits the current PN sequence via a pilot signal z[t] (the pilot signal z[t] is simply the current PN sequence multiplied by the all one Walsh code). The mobile unit then synchronizes its local code generator to the pilot signal after which the mobile unit can despread the received information bearing signals using its Walsh code and the current PN sequence.

The Walsh codes $W_i$, I=1, . . . 64 are perfectly orthogonal to each other such that, in a non-dispersive transmission channel, there will be complete separation among the users even despite being transmitted at the same time and on the same transmission frequencies.

Practical channels, however, are time dispersive, resulting in multipath effects where the receiver picks up many echoes of the transmitted signal each having different and randomly varying delays and amplitudes. In such a scenario, the code's orthogonality is destroyed and the users are no longer separated. Consequently, a mobile unit, when attempting to detect only a single user, regards all other channel users (including signals from other base stations) as creators of interference. This contributes to a decrease in signal-to-noise ratio (SNR) and thus, reduces the reception quality of the mobile unit.

In the presence of multipath channels, the mobile units additionally process the informationless pilot signal to identify and track the multipath parameters of the channel. For this purpose, the mobile units include a channel estimator which detects and tracks the attenuation, denoted by channel "tap" $\hat{h}_i$, and the relative delay, denoted by $\hat{\tau}_i$, for each of the main paths. The mobile units then utilize the channel information in their detection operations.

In pilot interference cancellation, estimates of interference from co-channel pilot signals from one or more base stations are formed at the receiver and subtracted out from the received signal in order to improve the detection of the desired signal or even multiple desired signals. Since each receiver sees less effective interference, it may need less transmitted power from the base station to obtain its desired block error rate. This transmit power savings may be used to support more users, or to provide higher data rates. The overall reduction in interference can also provide other benefits, such as increasing coverage area.

Pilot channel interference cancellation is particularly attractive because of its low implementation complexity. The information content and structure of pilot channels are known a priori, which makes accurate estimation and generation of interference terms relatively simple. However, it would be desirable to further reduce the computational complexity of pilot channel interference cancellation techniques.

Thus, there is a need for even less complex techniques for canceling pilot channel interference.

DETAILED DESCRIPTION

Figure 1:
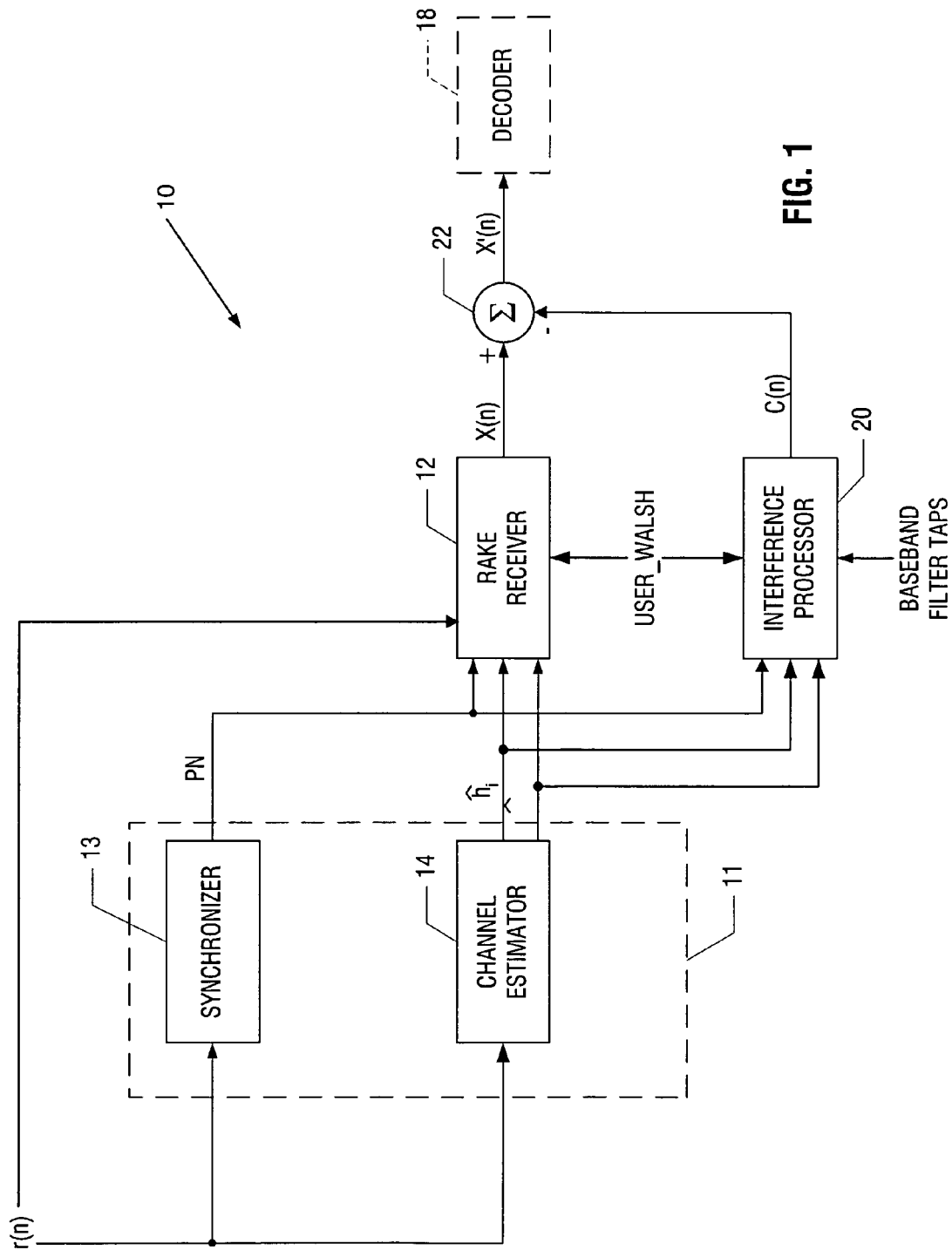
FIG. 1 is a block diagram illustration of a data detector for a mobile unit in accordance with one embodiment of the present invention.

A detector 10, shown in FIG. 1, for a mobile communication unit receives a signal r(n) and comprises a rake receiver 12, a pilot processor 11 and decoder 18 in one embodiment. The pilot processor 11 includes a synchronizer 13 and a channel estimator 14 in one embodiment. The detector 10 also comprises an interference processor 20 which utilizes the output of the existing channel estimator 14 and synchronizer 13 in one embodiment.

The signal r(n) is the version of the received signal after the latter has been filtered and down converted to a baseband signal and has been sampled at rate of M samples per chip and N chips per symbol where M and N are typically integers. In the IS-95 CDMA standard, there are 64 chips per symbol n and the chip rate is $1.2288 \times 10^6$ chips per second, i.e. $T_{chip}$ is about 0.8 $\mu$sec.

Synchronizer 13 synchronizes the detector to the PN sequence of the base station and provides the current PN sequence to the rake receiver 12 and the interference processor 20. Channel estimator 14 estimates the channel tap $h_i$ and the delay $\tau_i$ associated with each finger. Rake receiver 12 despreads the user data signal of the current user using the user's Walsh code (which is known a priori), the current PN sequence, the estimated channel taps $\hat{h}_i$ and the estimated finger delays $\hat{\tau}_i$. Rake receiver 12, shown in more detail in FIG. 3A, produces the estimated user data signal X(n), sampled once per symbol.

The received signal r(n) consists of the data signals of all of the active users (of the current base station and possibly of other, neighboring base stations), the pilot signals of at least the current base station and other interference terms caused by different noise sources in transmission, reception, etc. The term "pilot signal" may be used to refer to the pilot signal of the current base station which is, normally, the strongest pilot signal received by the mobile unit.

The interference processor 20 determines the crosstalk interference effect C(n) of the pilot signal on the user data signal X(n). Since the power of the pilot signal is typically significantly larger than that of any other channel user (to ensure that every synchronizer 13 can synchronize to it), removing the interference effect C(n) of the pilot signal (via a subtractor 22) should considerably improve the estimated user data signal X(n). Furthermore, as described hereinbelow, the interference effect is relatively simple to calculate and thus, interference processor 20 can be implemented in a mobile handset where the computational burden is advantageously reduced.

Subtractor 22 removes the interference effect C(n) from the rake receiver output X(n) thereby producing a new version X'(n) of the data signal. In some embodiments a subtractor 22 may be used within the rake receiver, for example, for each finger, instead of subtracting the total pilot interference from the rake output as shown in FIG. 1. The new version X'(n) may be decoded, via known methods, by a decoder 18 in one embodiment.

Figure 2:
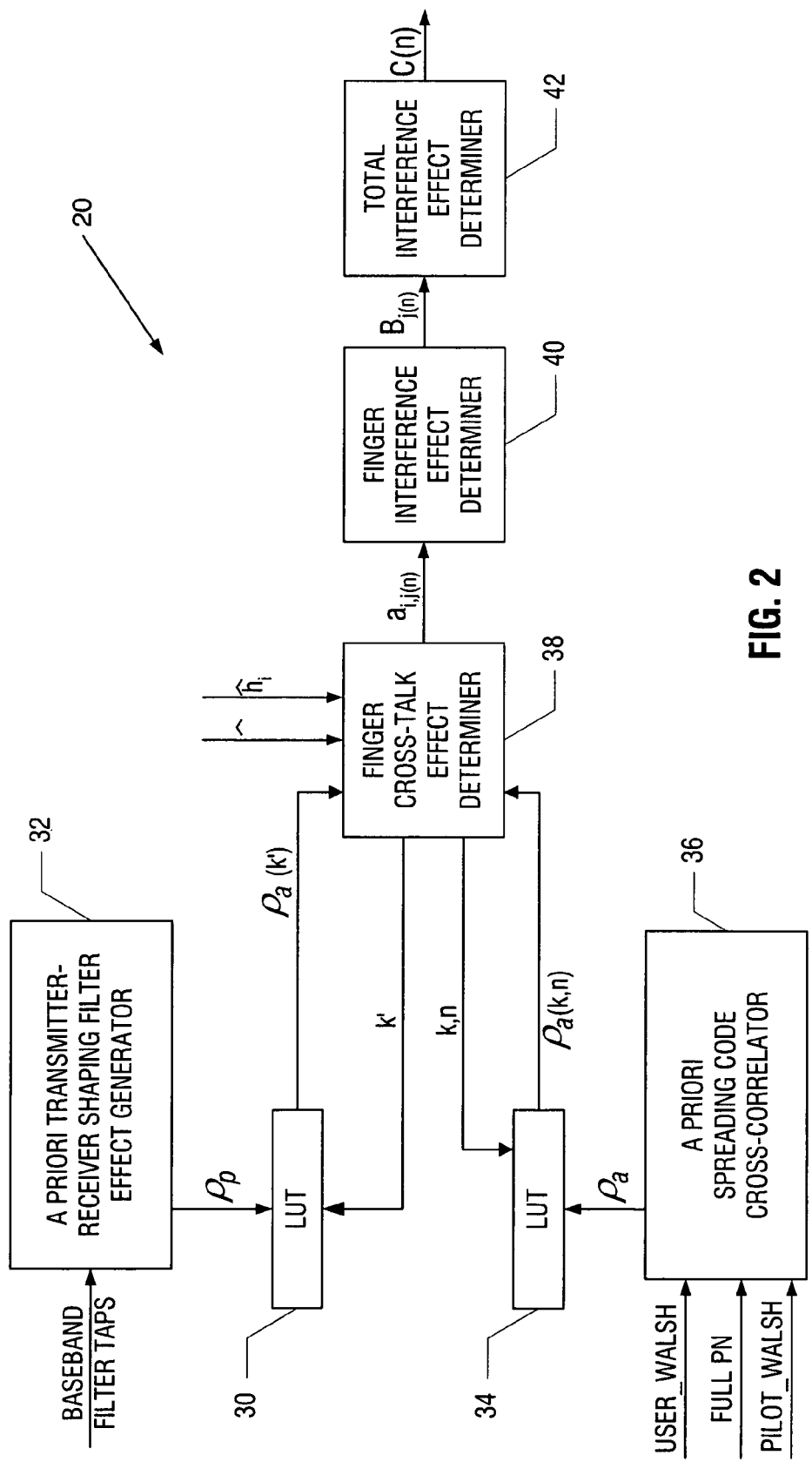
FIG. 2 is a block diagram of an interference processor useful in the detector of FIG. 1.

The interference processor 20, shown in FIG. 2, determines the crosstalk through the rake receiver 12 due to the pilot signal and from this, generates the interference effect caused by the pilot signal. The crosstalk is of the form $\hat{h}_i \hat{h}_j^* \rho_a(k,n) \rho_p(k')$, $i \neq j$ where * indicates the complex conjugate, $\rho_a(k,n)$ is the crosscorrelation of the user and pilot spreading codes for the nth transmitted symbol, $\rho_p(k')$ depends on the baseband filter taps and defines the effect of transmit and receive shaping filters on a transmitted signal, k is a delay defined in integral chips (i.e. k is an integer number) and k' is a delay defined in fractional chips (i.e. k' is a real number). Typically, k' is measured in units of $T_{chip}/M$.

Since the baseband filter taps are known a priori and do not change over time, $\rho_p(k')$ can be determined a priori for all possible values of k' and stored in a lookup table 30. A priori transmitter-receiver shaping filter effect generator 32 determines $\rho_p(k')$ as follows:

$$\rho_p(k') = \int_{-\infty}^{\infty} \alpha(t-k')\beta(-t)dt \qquad \text{Equation 1}$$

where k' typically varies from $-L^{Tchip}/M < k' < +L^{Tchip}/M$ in steps of $T_{chip}/M$, $\alpha(t)$ is the impulse response of the overall transmit shaping filter and $\beta(t)$ is the impulse response of the overall receive shaping filter. Since $\rho_p(k')$ decays as k' increases, L is chosen to indicate that point where $\rho_p(k')$ is very small. In other words, L is chosen such that $\rho_p(L^{Tchip}/M) << \rho_p(0)$. The transmit filter impulse response $\alpha(t)$ is defined, for example in the IS-95 standard. For IS-95 it is found in section 6.1.3.1.10 "Baseband Filtering" (pages 6-31-6-33 of IS-95-A+ TSB74). The receive filter impulse response $\beta(t)$ is a design option and is typically chosen to be equal to $\alpha(-t)^*$ in order to maximize the expected signal to noise ratio. The impulse responses $\alpha(t)$ and $\beta(t)$ are thus known a priori. The output of generator 32 is stored in lookup table 30, per the value of k'.

Since all Walsh codes and the entire PN sequence are known a priori (the PN sequence is finite and periodic), and since each symbol is transmitted with N values of the PN sequence, $\rho_a(k,n)$ can also be generated a priori, for all possible values of k and n and stored in a lookup table 34. A priori spreading code cross-correlator 36 determines $\rho_a(k,n)$ as follows:

$$\rho_a(k,n) = \frac{1}{2N} \sum_{m=0}^{N-1} q_{pilot}(m+k,n) q_{user}(m,n)^* \qquad \text{Equation 2}$$

$q_x(m,n) = x\_Walsh(m) * PN(m+nN)$ $x$ = pilot or user $0 \leq m \leq (L-1)$ per symbol $n$ $-\infty \leq n \leq \infty$ $PN(m+nN+kQ) = PN(m+nN) \forall m, n, k$ where, as defined in the above equation, the pilot and user Walsh codes q(m,n) are sequences of N chips and PN(n) is a periodic extension of a pseudo-random number sequence of length Q where, for the IS-95 standard, Q is $2^{15}$.

The interference processor 20 additionally comprises a finger crosstalk determiner 38 which receives the estimated channel taps $\hat{h}_i$, and the estimated finger delays $\hat{\tau}_i$, from the channel estimator 14 and utilizes them and the information stored in the two lookup tables 30 and 34 to determine the crosstalk effect of two fingers i,j for the given channel, channel delays and pilot signal.

Specifically, interference processor 20 begins by determining the value of $k_0'$, where $k_0' = \hat{\tau}_i - \hat{\tau}_j$, after which interference processor 20 activates crosstalk effect determiner 38 to determine the crosstalk effect $a_{i,j}(n)$ as follows:

$$a_{i,j}(n) = \sum_{k,k'} \hat{h}_j \rho_a(k,n) \rho_p(k') \qquad \text{Equation 3}$$

where the sum is performed for all k and k' within the ranges around $k_0'$ defined by $|k-int(k_0')| < J$ and $|k'-k_0| < J$, respectively. J is a design parameter and is typically in the range of 1 to 10. The delay differences k' and k are stepped by steps of one chip, where all delay difference k' includes the fractional portion of $k_0'$. Thus, if $k_0'$, is, for example, 7.25 chips, then k' might have values of 5.25, 6.25, 7.25, 8.25 and 9.25 and k might have values 5, 6, 7, 8 and 9.

The quantity $a_{i,j}(n)$ is an estimate of the interference of the pilot signal along finger i to the user signal at finger j. Any number of fingers can be assumed, although three are common. For three fingers, i and j vary from 0 to 2. In the IS-95 standard the Walsh codes are perfectly orthogonal, and the term $a_{i,i}(n)$ is identically zero. However, with non-orthogonal codes, this term is generally non-zero.

To calculate $a_{i,j}(n)$, interference processor 20 retrieves the value of $\rho_a(k,n)$ for each value of k and for the $n^{th}$ symbol from lookup table 34 and the value of $\tau_p(k')$ for each value of k' from lookup table 30. Interference processor 20 activates the crosstalk effect determiner 38 for each set (i,j) of fingers where, for each set, the value of $k_o'$ is first determined as are the ranges of k and k'.

Interference processor 20 additionally comprises a finger interference effect determiner 40 and a total interference effect determiner 42 in one embodiment. Finger interference effect determiner 40 determines the interference effect $B_j(n)$ per finger as:

$$B_j(n) = \sum_i a_{i,j}(n) \qquad \text{Equation 4}$$

where the sum is performed over the number of fingers in the channel.

The total interference effect determiner 42 determines the total interference effect C(n) as the sum of the $B_j(n)$. The total interference effect C(n) is the output of interference processor 20. As shown in FIG. 3B, the rake receiver 12 can subtract the individual finger interferences Bj(n) from the individual finger contributions, thereby directly producing the corrected, estimated user data signal X' (n).

By removing the interference effect of the pilot signal, a significant portion, though not all, of the noise which affects the user signal X(n) is removed, thus increasing the performance quality of the decoder 18. Furthermore, the computational burden of interference processor 20 is relatively small, in particular since the two crosscorrelations $\rho_a(k, n)$ and $\rho_p(k')$ can be determined a priori and stored in the lookup tables 30 and 34 in some embodiments. Alternatively, $\rho_a(k, n)$ can be determined "on-the-fly", from equation 2, since its computation only involves summation on PN "chips" which, in the IS-95 standard, accept only the values of ±1±j.

Figure 3A:
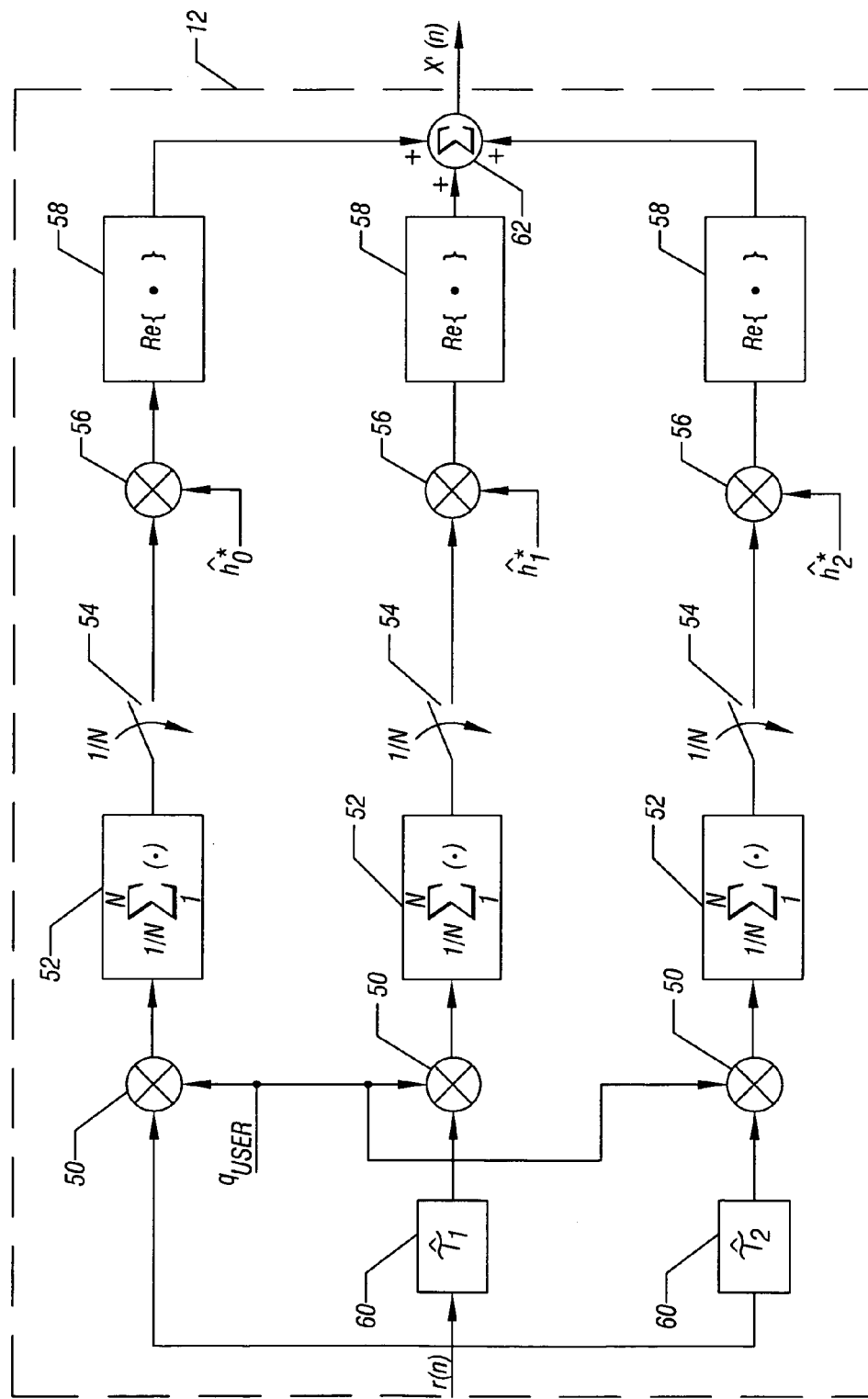
FIG. 3A is a block diagram of a standard prior art rake receiver useful in the data decoder of FIG. 1.
Figure 3B:
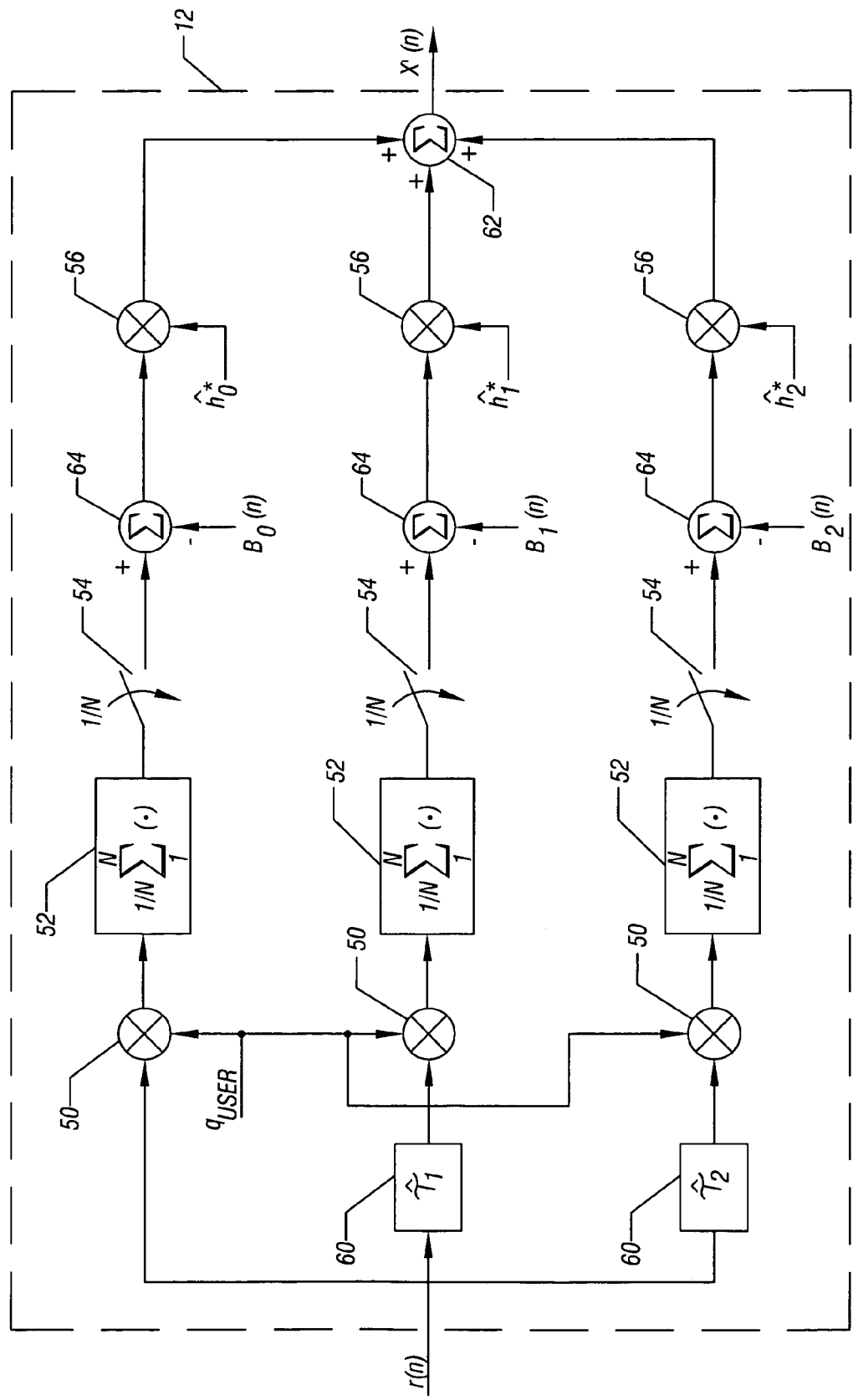
FIG. 3B is a block diagram of an pilot interference removing rake receiver, constructed and operative in accordance with an alternative embodiment of the present invention.

Rake receiver 12, shown in FIG. 3A, has three fingers, in one example, each performing approximately the same operation on its associated finger. Each finger includes a despreader 50, a windowing summer 52, a sampler 54, a finger gain multiplier 56 and a complex-to-real converter 58 in one embodiment. In addition, the second and third fingers include delays 60. In 3G embodiments, the converter 58 may be omitted.

The first finger, known as the $0^{th}$ finger, serves as the reference finger. The second and third fingers (referred to as the $1^{st}$ and $2^{nd}$ fingers), respectively, have delays defined by $\hat{\tau}_2$ and $\hat{\tau}_2$, respectively, relative to the $0^{th}$ finger. Delays 60 delay the received signal r(n) by their delay relative to the $0^{th}$ finger. For completion, $\hat{\tau}_0$ is set to zero.

Despreaders 50 despread the received signal r(n) (the $0^{th}$ finger) or the delayed signal (the $1^{st}$ and $2^{nd}$ fingers) via the spreading signal $q_{user}$. Windowing summer 52 sums the output of despreaders 50 over a window of N samples and divides the result by N. Samplers 54 sample every $N^{th}$ datapoint. Finger gain multipliers 56 multiply the sampled signal by the complex conjugate of the associated channel tap $\hat{h}_i$. Converters 58 take the real portion of the resultant signal. A summer 62 sums the output of each finger and produces therefrom the data signal X(n).

The rake receiver 12' of FIG. 3B is similar to that of FIG. 3A (and therefore, similar elements carry similar reference numerals) with the addition of three subtractors 64. Subtractors 64 subtract the finger interference effect $B_f(n)$ of the relevant finger from the output of the relevant multiplier 56. The output of rake receiver 12' is the corrected data signal X' (n).

Figure 4:
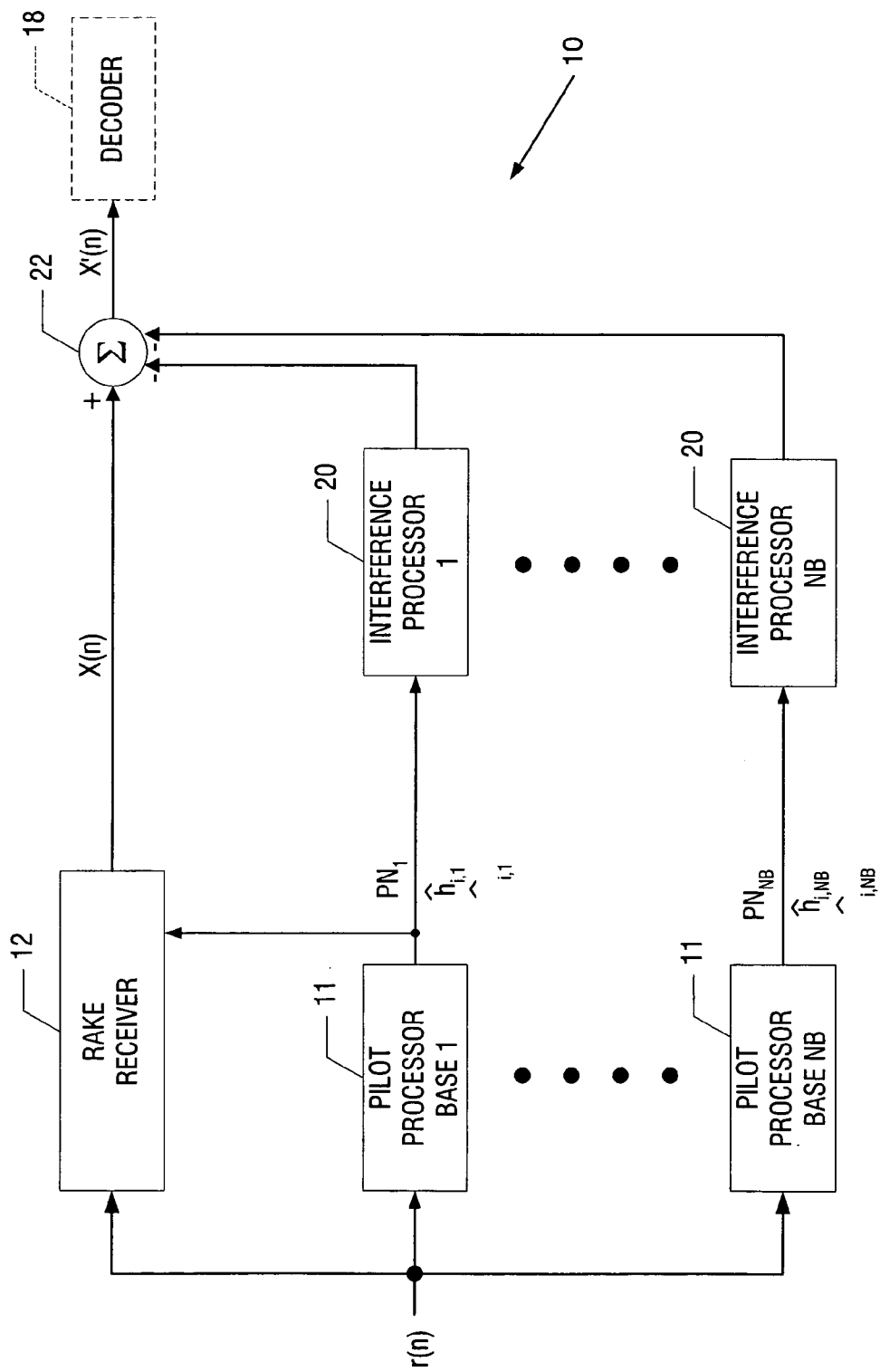
FIG. 4 is a block diagram of an alternative data detector for a mobile unit which removes the interference effect of multiple pilot signals, in accordance with one embodiment of the present invention.

The data detector 10' of FIG. 4 is particularly useful for mobile units when they are approximately equidistant between two or more base stations. At this position, the mobile units receive the pilot signals of the multiple base stations with approximately equal strength.

Both pilot signals interfere with the transmitted data signal.

The data detector 10' is similar to data detector 10 of FIG. 1 in that it includes rake receiver 12, subtractor 22 and decoder 18. Data detector 10' also includes a plurality NB of interference processors 20, one per base station that is interfering, and associated pilot processors 11. Each pilot processor 11 includes a synchronizer, a channel estimator and a delay estimator in one embodiment. However, in data detector 10', each pilot processor 11 synchronizes to the pilot of a different base station and, accordingly, each interference processor 20 generates the interference effect of the pilots of the different base stations. Subtractor 22 removes the multiple interference effect outputs of processors 20 from the data signal X(n) in order to produce the corrected signal X' (n) which optional decoder 18 then decodes.

In summary, the total pilot interference at the output of the rake receiver 12 is:

$$I_{Total}(n) = \sum_{f=1}^{F} \hat{h}_f^* B_f(n) \qquad \text{Equation 5}$$

$$= \sum_{f=1}^{F} \hat{h}_f^* \sum_{p=1}^{P} a_{f,p}(n)$$

$$= \sum_{f=1}^{F} \hat{h}_f^* \sum_{p=1}^{P} \hat{h}_p \sum_{k,k'} \rho_{a(f,p)}(k, n) \cdot \rho_p(k')$$

$$\cong \sum_{f=1}^{F} \hat{h}_f^* \sum_{p=1}^{P} \hat{h}_p \sum_{k=-J}^{J} \rho_{a(f,p)}(k_0 + k, n) \cdot$$

$$\rho_p(k \cdot M - (\hat{\tau}_f - \hat{\tau}_p))$$

$$= \sum_{f=1}^{F} \sum_{p=1}^{P} \sum_{k=-J}^{J} \hat{h}_f^* \hat{h}_p \rho_{a(f,p)}(k_0 + k, n) \cdot$$

$$\rho_p(k \cdot M - (\hat{\tau}_f - \hat{\tau}_p))$$

where:

$B_f(n)$ is the pilot interference corresponding to finger f, defined in Equation 4;

$a_{f,p}(n)$ is the pilot interference from the channel tap of finger p on finger f, defined in Equation 3 (As was mentioned earlier, $a_{f,p}(n)=0$ for f=p since the Walsh codes are orthogonal—hence the corresponding elements in Equation 5 need not be calculated.);

$\rho_{a(f,p)}(k,n)$ is the crosscorrelation term between the desired user signature at finger f and the pilot signature of finger p, at delay k and for the n-th symbol, defined in Equation 2;

$\rho_p(k')$ is the crosscorrelation between the transmit and receive filters, defined in Equation 1.

$\hat{h}_f$ is the estimated amplitude/phase of finger f;

$\hat{h}_p$ is the estimated amplitude/phase of path p;

F is the number of rake fingers at the receiver;

P is the total number of pilot paths over all paths of all base stations;

$k_0$ is the integer part of $\hat{\tau}_f - \hat{\tau}_p$, i.e. the delay in integer multiples of chips between finger f and finger p;

J is a design parameter, as explained in the text following Equation 3.

As can be seen, there are many different elements that need to be calculated and combined to produce the total pilot interference as seen at the rake output for the n-th symbol—Itotal(n). In order to further reduce the computational complexity, several different embodiments for different selection mechanisms are described herein. It is desirable to select those terms in Equation 5 that contribute the most to Itotal(n), thus reducing the computational complexity associated with the calculation of the different terms and reducing the computational complexity associated with their combining into the single term Itotal(n) while minimizing the loss in performance.

While the pilot cancellation mechanism described above is based on cross-correlation calculations, other pilot cancellation mechanisms can be derived based on re-generation of the pilot signals themselves rather than their cross-correlation effects at the rake outputs. The selection mechanisms described below apply to at least some of those pilot cancellation approaches as well.

Also, the same methods described herein below can be utilized when pilot channel interference cancellation is used in conjunction with multi-user detection receivers (known in the art) and in conjunction with interference cancellation receivers (known in the art).

In one embodiment, all terms $\hbar_f^* \hbar_p \rho_{a(f,p)}(k_0+k, n)\rho_p(k \cdot M-(\hat{\tau}_f-\hat{\tau}_p))$ are calculated, then these terms are sorted according to their magnitudes, and finally only the S strongest are used. S is a user defined parameter that allows trading combining complexity with performance.

In another embodiment, all terms $\hbar_f^* \hbar_p \rho_{a(f,p)}(k_0+k, n)\rho_p(k \cdot M-(\hat{\tau}_f-\hat{\tau}_p))$ are calculated, but only those terms that are above a pre-defined threshold TH1 are utilized.

The above two embodiments would indeed reduce the combining complexity, but still all terms need to be generated. A further reduction in performance that avoids generating all the terms, can be obtained by generating the selection decisions based on the channel tap estimates $\hbar_f \hbar_p$, and the cross-correlation between the Tx & Rx filter $\rho_p(k')$. The advantage is that the channel taps are normally very slowly varying compared to the symbol rate, and the elements of $\rho_p(k')$ are also very slowly varying (even slower than the channel taps). Hence, the selection can be made at a very low rate (e.g. once every 100 symbols); accordingly there is no need to calculate all the cross-correlation terms between the signature sequences and to combine them. Only, those terms that correspond to the selected elements need to be calculated and combined.

Figure 5:
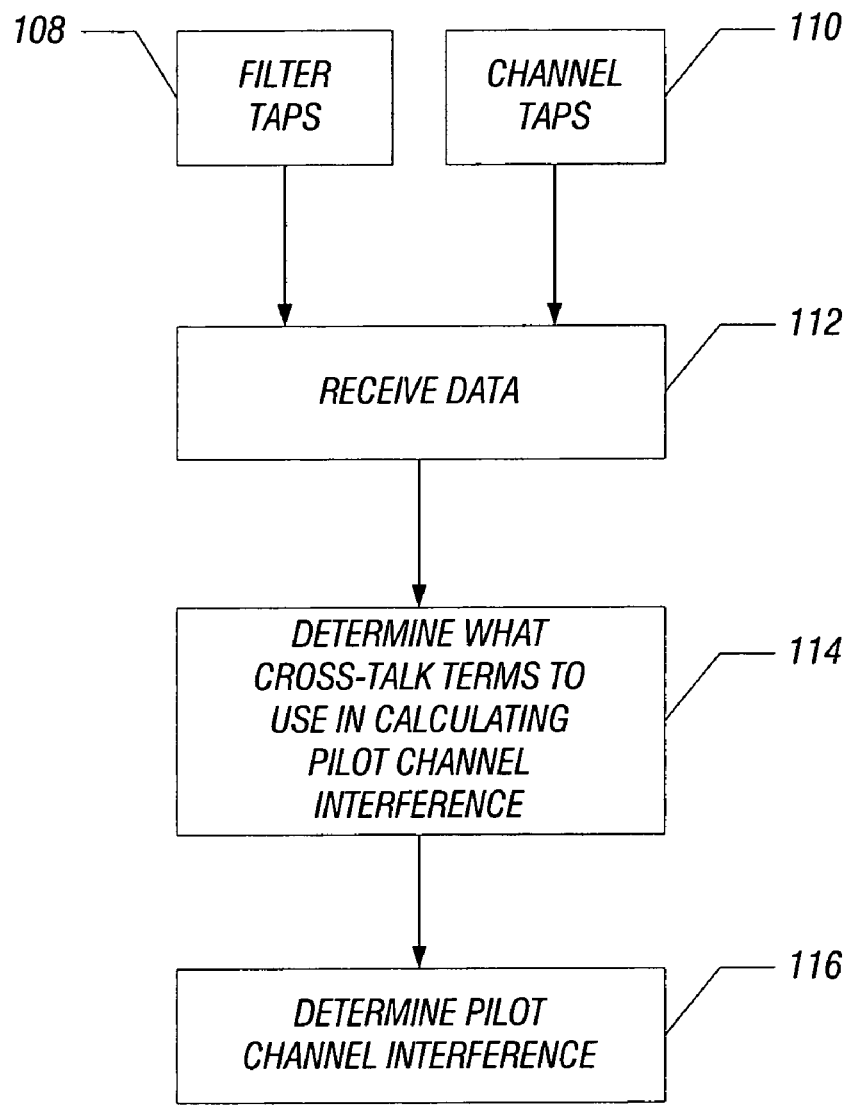
FIG. 5 is a flow chart in accordance with one embodiment of the present invention.

Referring to FIG. 5, filter tap data 108 and channel tap data 110 may be processed as indicated in block 112. A determination may then be made as to what crosstalk terms to use in calculating the pilot channel interference for interference cancellation purposes by a selection mechanism 114. Once that determination has been made, the pilot channel interference may be determined by an interference cancellation mechanism 116 calculating the pilot channels multiple access interference associated only with the selected terms.

In yet another embodiment, the different products $\hbar_p^* \cdot \hbar_f$ are first calculated, then sorted according to their magnitude, and finally only the S largest terms are considered. Therefore, the combining complexity is reduced, but also there is no need to calculate all the cross-correlation terms $\rho_{a(f,p)}(k,n)$ that are associated with those products $\hbar_p^* \cdot \hbar_f$ that were not selected. This saves both combining complexity and cross correlation complexity.

In yet another embodiment, in order to save the need to calculate all the cross-products $\hbar_p^* \cdot \hbar_f$, the channel taps $\hbar_f$ may first be sorted according to their magnitudes, then only cross products of the S1 strongest taps are calculated out of which the S2 largest products are selected.

In yet another embodiment, in addition to the above selection, additional complexity reduction may be achieved by setting the value of J in the term $$\sum_{k=-J}^{J} \rho_{a(f,p)}(k_0+k, n) \cdot \rho_p(k \cdot M - (\hat{\tau}_f - \hat{\tau}_p)),$$

to be different according to the delay between the p and f fingers. Thus, if the delay between the fingers is close to an integer multiple of Tc, $\rho_p(k')$ is close to a Nyquist pulse sampled at the correct sampling instances and hence J may be chosen to be close to zero. As the fractional delay approaches Tc/2, J should be increased to cover the effective time span of $\rho_p(k^1)$.

Figure 6:
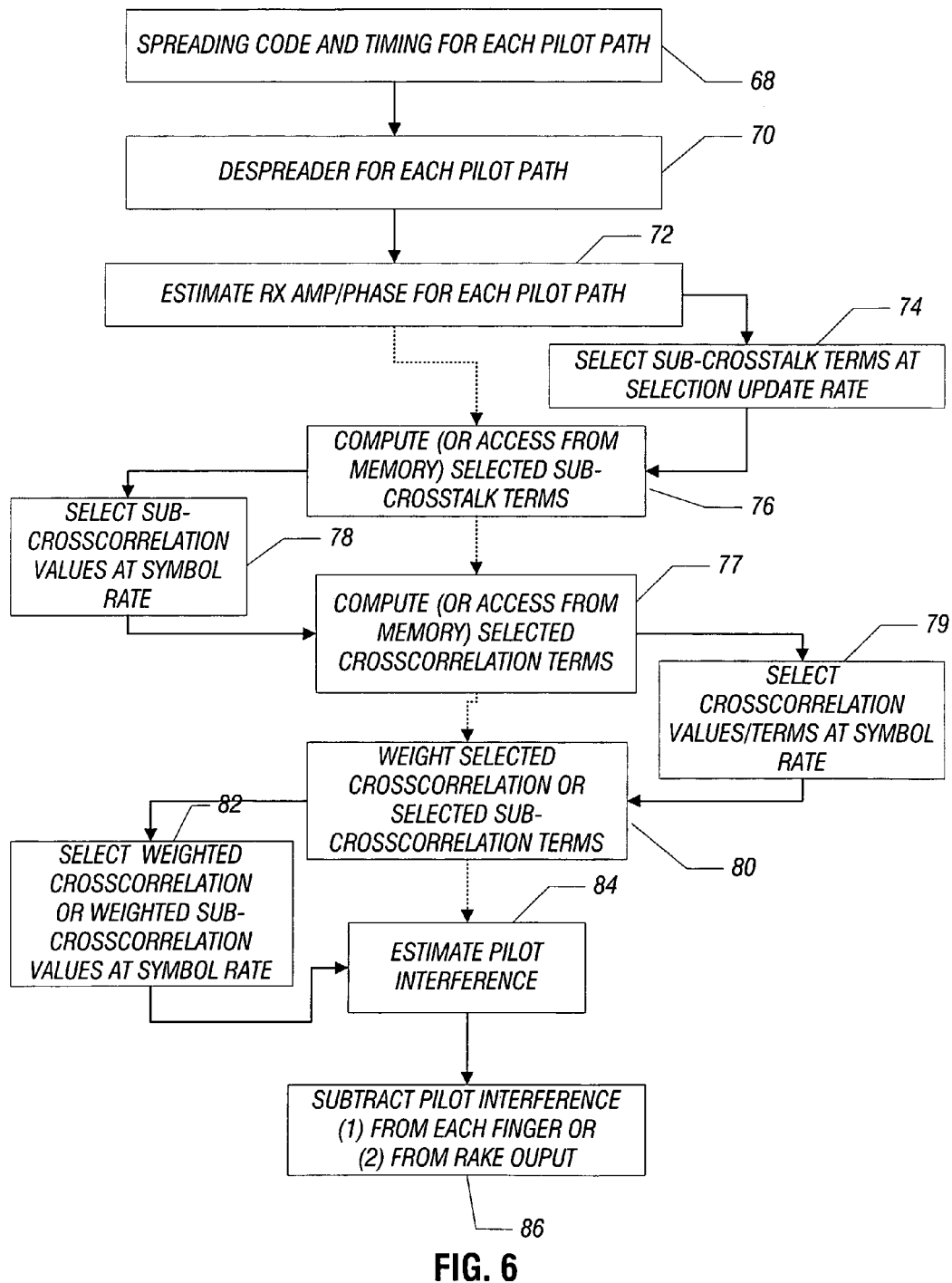
FIG. 6 is a flow chart in accordance with one embodiment of the present invention.

As yet another embodiment is presented in FIG. 6, the estimation of the interference terms for each finger that is associated with a pilot finger j of base station i begins by despreading the multiple pilot paths (block 68) of the surrounding base stations using a pilot finger correlator base i, pilot finger j, as indicated in block 70. Next the received amplitude and phase may be estimated for each pilot path as indicated in block 72. The output signal $\hbar_p$ results which includes $\hbar_f$ for the fingers.

For each pilot path the sub-crosstalk terms associated with the desired user code for each finger of the receiver 12, including baseband transmit and receive filter effects, can be determined as indicated in block 76 to compute $$C_{f,p} = \sum_{k=-J}^{J} \rho_{a(f,p)}(k_0+k, n) \cdot \rho_p(k \cdot M - (\hat{\tau}_f - \hat{\tau}_p))$$

or access these values from memory, if they have been precomputed and stored to speed and simplify subsequent computations.

Each of the sub-crosstalk terms may be appropriately weighted with the complex amplitude estimate of the corresponding pilot path to generate $$\hat{h}_p \sum_{k=-J}^{J} \rho_{a(f,p)}(k_0+k, n) \cdot \rho_p(k \cdot M - (\hat{\tau}_f - \hat{\tau}_p)).$$

In such case, one or more of the following options may be implemented. In a first option, the finger interference terms resulting from pilot path p interference, may be computed for the selected sub-crosstalk terms, $C_{f,p}$. In a second option, the rake-weighted finger interference terms resulting from pilot path p interference, $\hbar_f^* \hbar_p C_{f,p}$, may be computed for the selected sub-crosstalk terms, $C_{f,p}$. As a third option, the individual rake-weighted sub-crosscorrelation terms $\hbar_p^* \hbar_f \rho_{a(f,p)}(k_0+k, n) \cdot \rho_p(k \cdot M-(\hat{\tau}_f-\hat{\tau}_p))$ are computed.

The first option may be desirable when each finger's pilot interference is subtracted separately. The second and third options may be desirable when the total pilot interference is subtracted from the output of the rake receiver at one time.

Each finger of the receiver 12 then forms an estimate of the pilot interference, by adding up all of the crosscorrelation terms associated with the different pilot paths, as indicated in block 84. Next, the appropriate pilot interference from each finger of the receiver 12 may be subtracted out as indicated in block 86.

In one embodiment each finger's pilot interference may be subtracted separately in block 86. Then for each finger:

$$B_f = \sum_p \hat{h}_p C_{f,p} = \sum_{p,k,k'} \hat{h}_p \rho_{a(f,p)}(k,n) \rho_p(k')$$

According to Selection    According to Selection

In another embodiment, the total pilot interference may be subtracted from the output of the rake received at one time:

$$I_{Total} = \sum_f \hat{h}_f^* B_f = \sum_{f,p} \hat{h}_f^* \hat{h}_p C_{f,p}$$

According to Selection    According to Selection $$= \sum_{f,p,k,k'} \hat{h}_f^* \hat{h}_p \rho_{a(f,p)}(k,n) \rho_a(k')$$

According to Selection

The received path/finger amplitudes, $\hat{h}_f^*$, $\hat{h}_p$, and the product of the two values, $\hat{h}_f^* \hat{h}_p$, can also be obtained from the values computed in block 74.

A certain degree of complexity arises from the above-described operations, particularly with respect to the operation set forth in blocks 76, 78 and 84. As an example, assume there are B base stations with L paths per base station. In addition, assume that in taking into account the affect with a baseband filter on the crosscorrelation calculation, we consider T taps of a combined transmit/receive baseband filter. Therefore, the number of operations involved in blocks 76, 78 and 84 are approximately as follows. To determine the weighting for the crosscorrelation terms, (BL-1)LT crosscorrelation computations are needed including (BL-1)LT multiplications and (BL-1)L(T-1) additions. For third generation CDMA systems, these may all be complex-valued operations. The determination of weighted crosscorrelation terms may involve (BL-1)L complex-valued multiplications and the estimate of the pilot interference may involve (BL-2)L complex-valued additions.

If the spreading codes of the pilots and user signals are periodic and there is sufficient memory to store all of the crosscorrelations over the period of codes, some complexity may be reduced by not repeating calculations set forth at block 76 in each symbol. Rather, the stored crosscorrelation values can simply be updated when any change occurs, for example, upon the birth or death of a new finger, or when the relative timing of the received signal paths changes significantly.

The complexity of the pilot interference calculation may be further reduced by selecting only the strongest crosscorrelation terms to be estimated and processed. In accordance with one embodiment, the selection of the crosscorrelation terms may be based on the complex amplitude estimates of the corresponding pilot paths, as indicated at block 74. This approach essentially reduces the number of pilot paths being processed.

For example, the selection criteria to reduce crosscorrelation terms may involve simply taking the strongest L paths, all being chosen according to the processing power available. Alternatively, the criteria may be based on some threshold value such as the path that contains a minimum percentage of the total base station receive power or the path whose relative power is above some minimum value.

The methodology, in accordance with one embodiment, for selecting the sub-crosstalk terms in block 74 may be based on the magnitudes of the estimated received amplitudes, of a path and/or a finger:

$$I_{Total} = \sum_f \hat{h}_f^* \sum_p \hat{h}_p C_{f,p}$$

Selected based on strongest fingers, $|\hat{h}_f|$    Selected based on strongest paths, $|\hat{h}_p|$ Alternatively the magnitudes of products of estimated received amplitudes of path and/or finger $$I_{Total} = \sum_{f,p} \hat{h}_f^* \hat{h}_p C_{f,p}$$

Selected based on strongest $|\hat{h}_f^* \hat{h}_p|$ may be used as the selection criteria. As still another embodiment, the estimated equivalent transmit/receive filter tap weights $$I_{Total} = \sum_f \hat{h}_f^* \sum_p \hat{h}_p \sum_{k,k'} \rho_{a(f,p)}(k,n) \rho_p(k')$$

Selected based on strongest $\rho_p(k')$ may be used. Another embodiment may involve using the magnitudes of 3-way products of estimated received amplitudes of path and finger and the equivalent Tx/Rx filter tap weight:

$$I_{Total} = \sum_{f,p,k,k'} \hat{h}_f^* \hat{h}_p \rho_{a(f,p)}(k,n) \rho_p(k')$$

Selected based on strongest $|\hat{h}_f^* \hat{h}_p \rho_p(k')|$

Still another embodiment may use the magnitudes of sub-crosstalk terms as the selection criteria:

$$I_{Total} = \sum_{f,p,k,k'} \hat{h}_f^* \hat{h}_p \rho_{a(f,p)}(k,n) \rho_a(k')$$

Selected based on strongest $|\rho_{a(f,p)}(k,n)|$

Another useful selection criteria are the magnitudes of sub-crosscorrelation terms weighted by equivalent Tx/Rx filter tap weights $$I_{Total} = \sum_{\substack{f,p,k,k' \\ \text{Selected based on strongest} \\ |\rho_{a(f,n)}(k,n)\rho_p(k')|}} \hat{h}_f^* \hat{h}_p \rho_{a(f,p)}(k,n)\rho_p(k')$$

Also the magnitudes of sub-crosscorrelation terms weighted by equivalent Tx/Rx filter tap weights and the product of received amplitudes of corresponding path and finger $$I_{Total} = \sum_{\substack{f,p,k,k' \\ \text{Selected based on strongest} \\ |\hat{h}_f^* \hat{h}_p^* \rho_{a(f,p)}(k,n)\rho_p(k')|}} \hat{h}_f^* \hat{h}_p \rho_{a(f,p)}(k,n)\rho_p(k')$$

can be used in this fashion as can magnitudes of crosscorrelations terms, $$I_{Total} = \sum_{\substack{f,p \\ \text{Selected based on} \\ \text{strongest } |C_{f,p}|}} \hat{h}_f^* \hat{h}_p C_{f,p}$$

the magnitudes of crosscorrelation terms weighted by corresponding received path amplitude for each term $$I_{Total} = \sum_{\substack{f,p \\ \text{Selected based on} \\ \text{strongest } |\hat{h}_p C_{f,p}|}} \hat{h}_f^* \hat{h}_p C_{f,p}$$

and the magnitudes of crosscorrelation terms weighted by product of received amplitudes of corresponding path and finger $$I_{Total} = \sum_{\substack{f,p \\ \text{Selected based on} \\ \text{strongest } |\hat{h}_f^* \hat{h}_p C_{f,p}|}} \hat{h}_f^* \hat{h}_p C_{f,p}$$

The selection process may be as follows in some embodiments:

1. choose the S terms with the strongest selection parameter values (S fixed) such as those described above; and/or
2. choose all terms with selection parameters above some absolute threshold; and/or
3. choose all terms with selection criteria above some relative threshold.

Eliminating P paths using this approach saves PLT complex-valued crosstalk computations that would occur at block 76. This includes PLT complex-valued multiplications and PL(T-1) complex-valued additions, assuming that crosscorrelations are not stored in memory. In addition, PL complex valued multiplications may be saved, during the operation indicated at block 80, and PL complex-valued additions may be saved in the operation indicated at block 84.

In accordance with still another embodiment, the selection of the crosstalk terms may be based on the crosstalk values that result from the computation of the crosstalk terms in the operation indicated at block 76. In this case, the crosstalk values, once computed, may be selected as indicated at block 78.

A number of different types of selection criteria may be utilized to select from among the crosstalk values. For example, the selection criteria may involve simply taking the strongest S1 crosstalk values, S1 being chosen according processing power available. As another embodiment, the criteria may be based on some threshold value such as the crosstalk value that contains a minimum percentage of the total crosstalk power or that the crosstalk relative power is above some minimum value.

Eliminating N crosstalk values from being processed based on this criteria saves N complex-valued multiplications in the operation indicated in block 79 and N complex-valued additions in the operation indicated in block 84.

As still another approach, instead of basing the selection criteria on crosstalk values alone, the selection criteria may be based on the weighted crosstalk values as indicated in block 82. Eliminating N weighted crosstalk values from being processed, based on this criteria, saves N complex-valued additions in the operation indicated at block 84.

Again, it may be possible in some embodiments to store the selection decisions of all weighted crosstalk values over the entire period of the spreading code. This avoids recomputation of the weighted crosstalk values that were already determined to be negligible. If the formerly negligible, weighted crosstalk values change significantly, then the selection decision table entry may be reset.

In some embodiments, a variety of the approaches represented by blocks 74, 78, 79 and 82 may be utilized in tandem, alone, or in any combination. Using the first approach, indicated in block 74, eliminates certain pilot paths from consideration. Using the second approach, indicated in block 78, further eliminates some of the crosstalks of the remaining pilot paths from being processed. Finally, using the approach indicated in block 82 further reduces the number of weighted crosscorrelations that are processed in the operation indicated in block 84.

In the embodiments previously described, the pilot interference cancellation and the application of crosstalk selection is primarily done in terms of post-despread crosscorrelation based pilot interference cancellation. A similar approach can be used to simplify the implementation of respread/despread pilot interference cancellation. In this interference cancellation algorithm, the actual interference signal is regenerated by respreading the pilot data with the appropriate pilot spreading code and then filtering with the appropriate baseband filter taps at the sample rate.

Cancellation of the interference is contributed by a pilot path to a user signal path (a finger) can then be done by canceling the regenerated spread pilot signal estimate from the received signal at the sample rate. As another example, the regenerated pilot signal estimate may be correlated with the user code and then the resulting crosstalk may be canceled from the despread received signal at the symbol rate. The approaches to simplification illustrated in FIG. 6 can also be used to simplify the implementation of a respread/despread pilot interference cancellation algorithm.

The principles set forth herein apply equally well to systems involving the joint detection of multiple users as well as the cancellation of the interference resulting from multiple user channels and/or multipath. Instead of just L multipath detection branches of a single data user, one may have KL detection branches for detecting K users. For each detection branch, the weighted crosscorrelation terms The principles set forth herein apply equally well to systems involving the joint detection of multiple users as well as the cancellation of the interference resulting from multiple user channels and/or multipath. Instead of just L multipath detection branches of a single data user, one may have KL detection branches for detecting K users. For each detection branch, the weighted crosscorrelation terms resulting from all other signals and paths including, but not limited to, the pilot signals, may be canceled.

Finally, while embodiments of the present invention have been described in the context of a CDMA downlink, the principles set forth herein apply equally to CDMA uplinks including pilot channels such as those used in third generation CDMA systems.

With particular embodiments of the present invention, improved capacity, coverage and performance may be achieved in wireless CDMA systems without requiring any changes to the transmitters including the base stations. In addition, the capacity gains can also be translated to supporting the delivery of hired data rate services in some embodiments.

Figure 7:
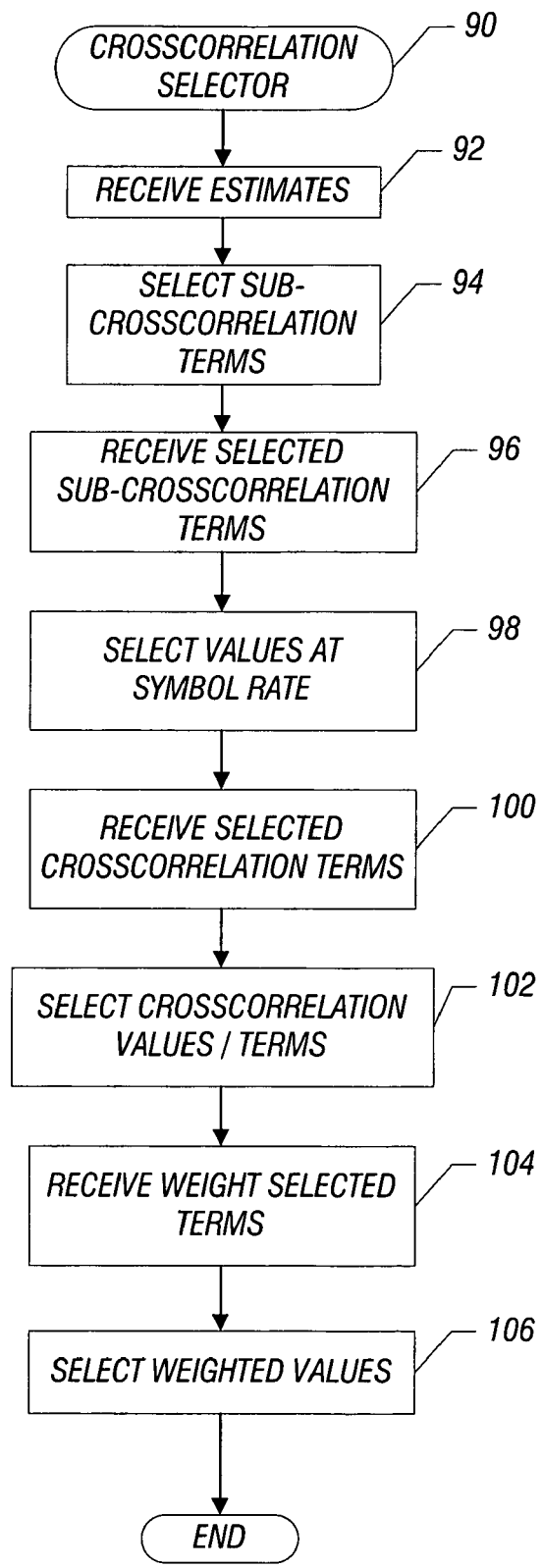
FIG. 7 is a flow chart for software in accordance with one embodiment.

Finally, referring to FIG. 7, in accordance with one embodiment, the reduction of complexity illustrated in FIG. 6 may be implemented by software. In such case, each of the actions indicated by blocks 74, 78, 79 and 82 may be implemented in software after receiving the results of the other operations which, in one embodiment, may be implemented in hardware. Thus, the crosscorrelation selection software 90 may be stored, in one embodiment, in a processor-based interference processor 20.

In general, the software 90 receives the estimates, as indicated at block 92, of the receiver amplitude/phase for each pilot path determined at the block 72 (FIG. 6) and selects the crosscorrelation terms as indicated in block 94. Then, the software 90 may receive the selected sub-crosscorrelation terms as indicated at block 96 and determined in block 76 (of FIG. 6) and in response may select the values at the symbol rate as indicated in block 98 in FIG. 7. Next the selective crosscorrelation terms determined in block 77 (in FIG. 6) may be received as indicated in block 100 in FIG. 7. Based on this information, the crosscorrelation values or terms may be selected as indicated in block 102. Next, the weight selected crosscorrelation or selected sub-crosscorrelation terms may be determined as indicated in block 80 (in FIG. 6) and this information may be received as indicated in block 104 of FIG. 7. The received information may then be used to select the weighted values as indicated in block 106 in FIG. 7.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a pilot channels multiple access interference cancellation mechanism; and
    a selection mechanism, said selection mechanism to select only a portion of pilot multiple access interference terms to be calculated by the cancellation mechanism, wherein said selection mechanism to select weighted crosscorrelation terms and to exclude other weighted crosscorrelation terms.

2. The apparatus of claim 1 where pilot channels multiple access interference cancellation mechanism is based on calculating crosscorrelation between pilot channels signatures and at least one user signature.

3. The apparatus of claim 1 where pilot channels multiple access interference cancellation mechanism is based on regenerating pilot signals and canceling their effects prior to despreading.

4. The apparatus of claim 1 where pilot channels multiple access interference cancellation mechanism is based on regenerating pilot signals and canceling their effects after despreading.

5. The apparatus of claim 1 where said selection mechanism provides an a priori chosen complexity level for the pilot channels multiple access interference cancellation mechanism while maximizing interference cancellation effects.

6. The apparatus of claim 1 wherein said cancellation mechanism is based on filter taps.

7. The apparatus of claim 1 wherein said cancellation mechanism is based on channel taps estimators.

8. The apparatus of claim 1 wherein said selection mechanism is based on channel taps estimators and filter taps.

9. The apparatus of claim 1 wherein said cancellation mechanism is based on crosscorrelation values.

10. The apparatus of claim 1 wherein said selection mechanism is based on channel taps estimators, filter taps, and crosscorrelation values.

11. The apparatus of claim 1 wherein said selection mechanism selects crosstalk terms that exceed a threshold.

12. The apparatus according to claim 11, where the cancellation mechanism cancels only effects of the crosstalk terms that exceed the threshold.

13. The apparatus of claim 1 wherein said selection mechanism selects a pilot path based on whether or not terms exceed a threshold value.

14. The apparatus of claim 1 wherein said selection mechanism selects crosscorrelation values at a symbol rate and excludes other crosscorrelation values at the symbol rate.

15. The apparatus of claim 1 wherein the cancellation mechanism calculates less than all of the pilot multiple access interference terms in order to determine a pilot interference effect to be canceled.

16. A method comprising:
    calculating pilot multiple access interference terms to cancel pilot channel interference;
    selecting only a portion of the pilot multiple access interference; and
    selecting the multiple access interference terms based on a complexity level of a resulting calculation and an effectiveness of interference cancellation.

17. The method of claim 16 including calculating all the terms of the pilot multiple access interference and selecting only certain of said terms for use in connection with pilot channel interference cancellation.

18. The method of claim 16 including calculating less than all of the interference terms of the pilot multiple access interference in order to determine the pilot multiple access interference effect to be canceled.

19. The method of claim 16 including determining a pilot channels multiple access interference based at least in part on crosscorrelation between pilot channel signatures and at least one user signature.

20. The method of claim 16 including calculating a pilot channels multiple access interference cancellation based at least in part on regenerating pilot signals and canceling their effects prior to despreading.

21. The method of claim 16 including determining a pilot channels multiple access interference calculation based at least in part on regenerating new pilot signals and canceling their effects after despreading.

22. An article comprising a medium storing instructions that enable a processor-based system to:
   calculate pilot multiple access interference terms to cancel pilot channel interference; and
   select only a portion of the pilot multiple access interference terms by selecting weighted crosscorrelation terms and excluding other weighted crosscorrelation terms.

23. The article of claim 22 further storing instructions that enable the processor-based system to calculate all the terms of the pilot multiple access interference and select only certain of said terms for use in connection with pilot channel interference cancellation.

24. The article of claim 22 further storing instructions that enable the processor-based system to calculate less than all of the interference terms of the pilot multiple access interference in order to determine the pilot multiple access interference effect to be canceled.

25. The article of claim 22 further storing instructions that enable the processor-based system to determine pilot channels multiple access interference based at least in part on crosscorrelation between pilot channel signatures and at least one user signature.

26. The article of claim 22 further storing instructions that enable the processor-based system to calculate pilot channels multiple access interference cancellation based at least in part on regenerating pilot signals and canceling their effects prior to despreading.

* * * * *